(12) United States Patent
Prasad

(10) Patent No.: US 10,179,982 B2
(45) Date of Patent: Jan. 15, 2019

(54) SNOW REMOVING SYSTEM

(76) Inventor: Hari Prasad, Troy, MI (US)

( * ) Notice: Subject to any disclaimer, the term of this patent is extended or adjusted under 35 U.S.C. 154(b) by 2131 days.

(21) Appl. No.: 14/759,082

(22) PCT Filed: Apr. 1, 2010

(86) PCT No.: PCT/US2010/001007
§ 371 (c)(1),
(2), (4) Date: Aug. 1, 2016

(87) PCT Pub. No.: WO2010/114623
PCT Pub. Date: Oct. 7, 2010

(65) Prior Publication Data
US 2016/0340846 A1    Nov. 24, 2016

Related U.S. Application Data

(60) Provisional application No. 61/211,637, filed on Apr. 2, 2009.

(51) Int. Cl.
| | | |
|---|---|---|
| *E01H 5/04* | (2006.01) | |
| *E01H 5/00* | (2006.01) | |
| *E01H 5/08* | (2006.01) | |
| *E01H 5/09* | (2006.01) | |
| *E01H 10/00* | (2006.01) | |
| *B60R 25/10* | (2013.01) | |
| *E01H 5/06* | (2006.01) | |
| *E01H 5/07* | (2006.01) | |
| *E01H 5/12* | (2006.01) | |
| *G05D 1/02* | (2006.01) | |

(52) U.S. Cl.
CPC ............... *E01H 5/04* (2013.01); *B60R 25/10* (2013.01); *E01H 5/00* (2013.01); *E01H 5/045* (2013.01); *E01H 5/061* (2013.01); *E01H 5/076* (2013.01); *E01H 5/08* (2013.01); *E01H 5/092* (2013.01); *E01H 5/098* (2013.01); *E01H 5/12* (2013.01); *E01H 10/007* (2013.01); *G05D 1/0276* (2013.01); *G05D 1/0278* (2013.01)

(58) Field of Classification Search
CPC combination set(s) only.
See application file for complete search history.

(56) References Cited

U.S. PATENT DOCUMENTS

| 2,055,794 | A | * | 9/1936 | Hewitt | ............ | C10M 5/00 |
| | | | | | | 37/231 |
| 2,198,407 | A | * | 4/1940 | De Brun | ............ | E01H 5/04 |
| | | | | | | 180/323 |
| 3,074,188 | A | * | 1/1963 | Etnyre | ............ | E01H 5/076 |
| | | | | | | 37/254 |

(Continued)

FOREIGN PATENT DOCUMENTS

| DE | 3226273 | A1 | * | 1/1984 | ............ | E01H 5/076 |
| JP | 2001131934 | A | * | 5/2001 | | |
| JP | 2008063858 | A | * | 3/2008 | | |

*Primary Examiner* — Christopher R Harmon

(57) ABSTRACT

This invention relates to the art of removing snow from driveways, walkways, roads, and the like. The snow removing system removes snow from the driveway and disposes it. The system can be operated by a person or by a computer program or by remote controller. The system comprises of components that are relatively small that can be easily assembled and stowed away after use. The system is easy use and does not require manual labor other than an easy setup and dismantle operations.

4 Claims, 3 Drawing Sheets

(56) References Cited

U.S. PATENT DOCUMENTS

| | | | | |
|---|---|---|---|---|
| 3,196,863 A | * | 7/1965 | Fayed | E01H 5/10 |
| | | | | 126/271.2 R |
| 3,484,962 A | * | 12/1969 | Klapprodt | E01H 5/076 |
| | | | | 37/256 |
| 4,592,108 A | * | 6/1986 | Svendsen | B28D 1/181 |
| | | | | 125/5 |
| 5,742,967 A | * | 4/1998 | Giessler | E01H 1/042 |
| | | | | 15/340.3 |
| 2005/0246088 A1 | * | 11/2005 | Doherty | E01H 10/007 |
| | | | | 701/80 |
| 2010/0005688 A1 | * | 1/2010 | Lins | E01H 1/00 |
| | | | | 37/197 |
| 2010/0148947 A1 | * | 6/2010 | Morgan | B60R 25/04 |
| | | | | 340/426.22 |

\* cited by examiner

VIEW A IN FIG.2

SNOW REMOVING SYSTEM

FIELD OF INVENTION

The present invention relates generally to automatic or manual snow removal methods in residential and commercial driveways, walkways and the like.

BACKGROUND OF THE INVENTION

The practice of snow removal by machines has been in existence for many decades. The earliest mode of removal of snow has been through the use of hand held tools such as shovels and spades. Eventually snow throwers which are capable of shooting a stream of snow were developed and they are powered either by gas engines or electric motors. The other mode of displacing snow is to use snow plows attached to vehicles. All these operations require physical maneuvering of the equipments or driving a vehicle. This is physically straining and also is considered a health hazard. People having heart attack during shoveling snow is not uncommon. Physically weak, disabled, and handicapped people find it very difficult to shovel the snow or even use snow powered snow throwers. During a prolonged snow it is hard to maintain the driveway free of snow all the times. There are no simple systems that are available in today's market for a simple house hold to solve the above mentions problems and inconveniences.

The objective of the current invention is to minimize the maneuvering of the equipments other a simple setup and removal. The operation can be done remotely and also by carried out by a programmable computer. The user need not be in the open during the operation and can control the operation from inside a car or home. The other objective of the invention is to eliminate or reduce emissions and noise pollution caused by gasoline engines.

SUMMARY OF THE INVENTION

The basic idea is that a snow thrower, operating at the lateral edge of a driveway disposes of the snow from the driveway into an area away from the driveway such as a lawn. With whole system of wheels, the snow thrower, moves along the edge of the driveway during the cleaning operation while the snow from the center areas of the driveway is delivered to them by a plow that move across the driveway. After one sweep across the driveway by the plow and after the snow thrower, disposes the collected snow the whole system advances further along the driveway in incremental steps. After the incremental advancement the plow again moves across the driveway and accumulates the snow at its face and delivers it to the snow thrower, at the other end of the driveway. Thus by the repeated motion of the plow across and along the driveway and the disposal of the collected snow by one or two snow throwers completes the snow removal process. Once the snow removal operation is complete the system can be stowed away in parts. The motion of the snow throwing system and the snow collecting system is controlled by motion control devices and also through the rails that are fixed to the ground to which the snow throwers are connected through a flexible link.

DETAILED DESCRIPTION OF THE PREFERRED EMBODIMENTS

Figure 1:
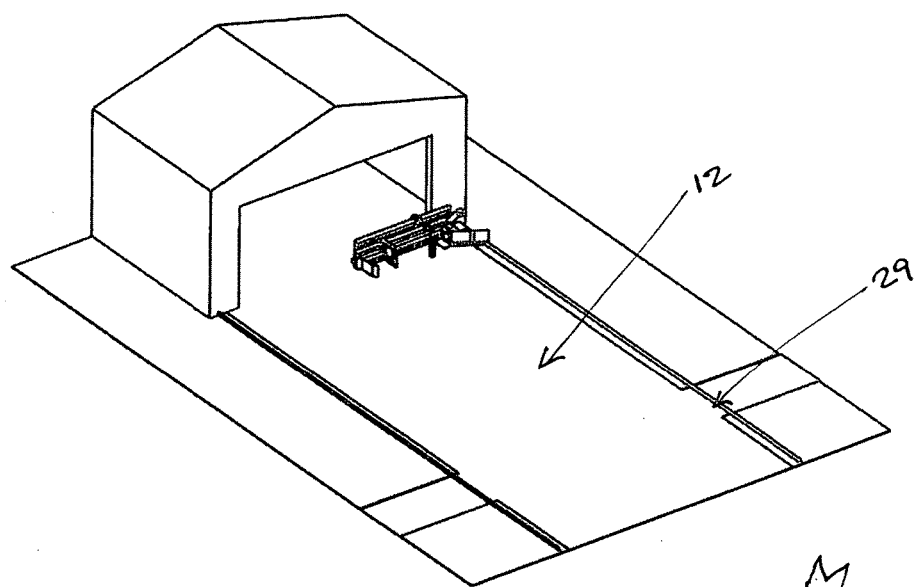
FIG. 1 is a perspective view of a typical garage with a driveway and its surrounding. Along the edges of the driveway are the guide beams beginning from the garage and ending at the end of the driveway.
Figure 2:
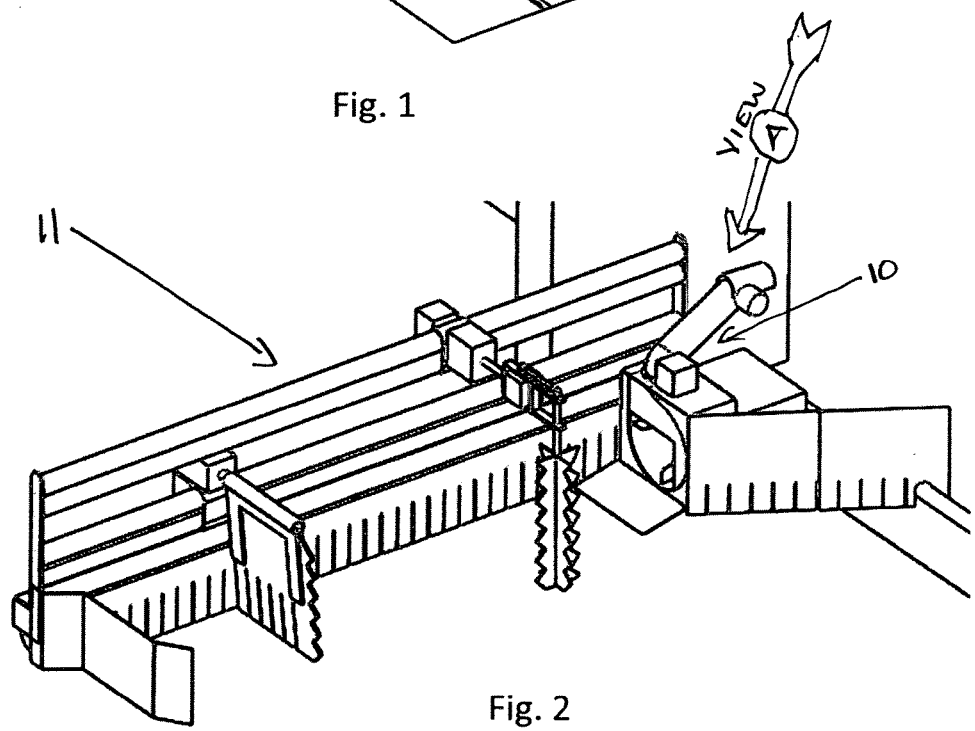
FIG. 2 is a perspective of the components of the snow removing system. Snow collecting system, snow thrower, housing, etc., are shown
Figure 3:
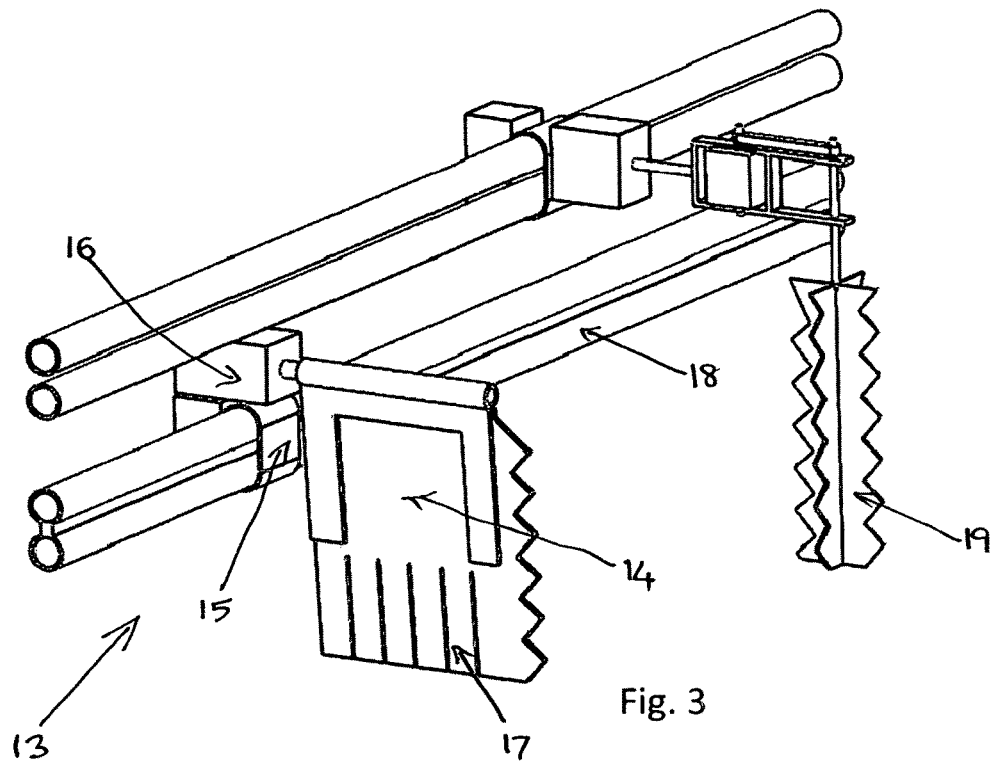
FIG. 3 is a perspective view of the components of the plow and scraping system are shown.
Figure 4:
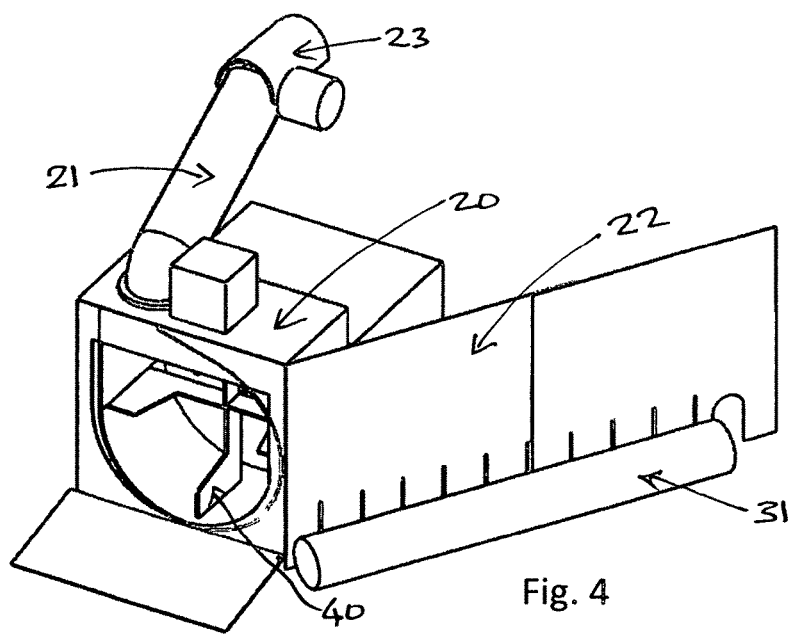
FIG. 4 is a perspective view of the snow throwing system.
Figure 5:
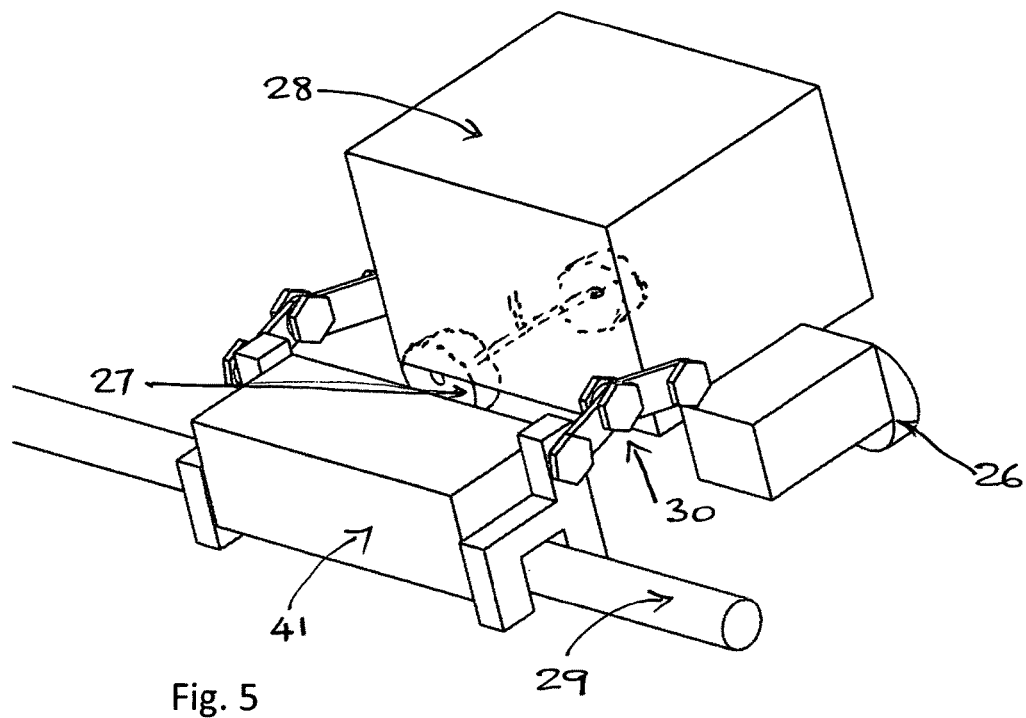
FIG. 5 is the perspective view of the drive system viewed along the direction A shown in FIG. 2
Figure 6:
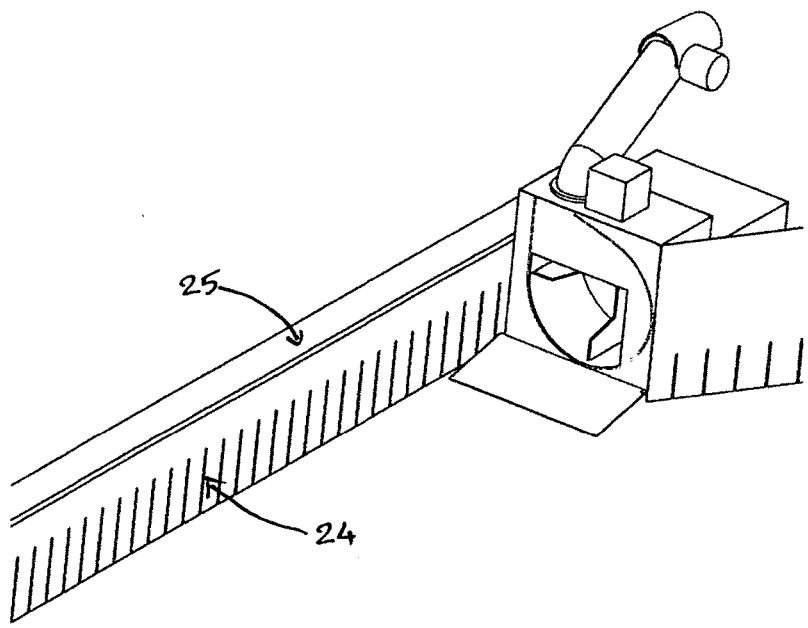
FIG. 6 is the perspective view of an optional sweeping system.

Basic working principle of the snow removing system 11: A snow thrower 10, located at the lateral edge of the driveway 12 discharges the snow away from the driveway 12. A plow 14 that moves across the driveway 12 collects the snow from the driveway 12 and feeds to the snow thrower 10. The system can have a snow thrower 10, at either side of the driveway 12 or only on one side. The method of operation differs for each case. The system advances in incremental steps to completely remove the snow from the driveway 12.

The snow removing system 11 is complex and comprises of subsystems those work in unison.

Snow Collecting System 13 Comprising:

A snow collecting system 13 that moves the snow from the driveway 12 to the lateral edge or edges of the driveway 12 or any area from which snow is removed. The snow collecting system 13 comprises of one or more plows 14 that move across the driveway 12. During such movement the snow is collected from the ground and the snow accumulates at the face of the plow 14. When the plow 14 reaches the lateral edge of the driveway 12 it forces the snow into the casing 20 of the snow thrower 10, and comes to a stop. The snow thrower 10, empties the snow in the casing 20 through a chute. The components of the snow collecting system 13 are: a slider support beam 18 oriented across full width of the driveway 12 or shorter depending upon the width of the driveway 12 that needs to be cleaned. At least one end of the slider support beam 18 is attached in a rotatable manner so that it can be tilted to a vertical position. A plow 14 slider is driven by a plow slider motor 16 along the slide support beam. The plow slider 15 interfaces with the slider support beam 18 through bearing rollers, wheels or simply glides over the slider support beam 18. The slider motor 16 shaft has a wheel that engages directly with the beam and during the rotation of the wheel the plow slider 15 moves along the slider support beam 18. The slider motor is reversible in the direction of rotation that enables the plow slider 15 to travel in either direction. A plow 14 made of a thin and strong material is attached to the plow slider 15 through a plow frame and at the bottom of the plow 14 is attached plow fingers 17 which are made from flexible material. The purpose of the plow fingers 17 is to maintain a constant contact with the ground that may be an uneven surface.

Snow Sweeping System Comprising:

A sweeper 24 is a thin flexible member with finger like features is attached to a prismatic sweeper support beam 25 that runs parallel to and attached at the ends to the slider support beam 18. The purpose of the sweeper 24 is to accumulate any snow that is left uncollected by the plow 14. A portion of the plow 14 rubs against the sweeper 24 to ensure complete cleanup. The finger like feature is to maintain a constant contact with the ground that may be uneven and ensure a thorough cleanup.

Snow Scraping System Comprising:

A motor driven roller with hard bristles that attaches to the plow frame positioned parallel to the plow 14 scrapes the surface to dislodge any snow that is packed and strongly adhering to the ground.

The system also comprises of a vibrating chisels arranged over a beam that leads the collecting system and dislodges packed and adhered snow. (Not shown in picture)

Snow Cutting System Comprising:

A snow cutter 19 is a motor driven spinning blade with serrated edges is located just ahead of the plow 14. In case of a packed snow the snow cutter 19 is allowed to cut the snow pile before the plow 14 comes in contact. The snow cutter 19 dislodges the leading edge of the packed snow pile making it easier for the plow 14 to sweep the snow. The snow cutter 19 works on a support and sliding system that is very similar to the plow 14 system. Once the snow cutter 19 takes a pass across the driveway 12 it swings out of the way and creates room for the plow 14 to come in contact with the snow pile.

Drive System Comprising:

A housing 28 unit located at the lateral edge of the driveway 12 at one end of the slider support beam 18 hosts the drive system. The drive system comprises of a motor driven wheel 26 located inside the rear end of the housing. The wheel 26 has a serrated profile to establish a slip free contact with the ground. Two steering wheels 27 that can be steered by a stepper motor is oriented in front of the motor driven wheel 26. An auxiliary drive 41 that encloses a section of the guide rail also provides propulsion to the snow removing system 11. The housing 28 also accommodates a control module and power distribution module.

Snow Throwing System Comprising:

A motor driven impeller 40 with two or more blades that spin at high speed thereby throwing the snow that comes in contact with the impellers 40 is encased in a casing 20 and the whole assembly is attached to the housing. A discharge chute 21 that is oriented on the casing 20 that can rotate on a vertical axis through a chute motor discharges the snow in the desired direction. At the end of the chute 21 is a motor driven diverter 23 that controls the height of the throw.

A non-stick coating is applied to all surfaces that come in contact with the snow that prevents the snow from sticking to the surface and eventually clogging the snow path.

Guiding System Comprising:

A number of pegs one end of each is planted in to the ground along the lateral edge profile of the driveway 12 while the other end supports a modularized prismatic guide beam 29 that follows the lateral edge profile of the driveway 12. This enables the system to be guided properly along the driveway 12 whether it is straight or curved. A number of telescoping members located along the said guide beam 29 that allows breaks in the continuity of the said guide beam 29 and can bridge the broken segments when needed. The guide rail is connected to the housing 28 that hosts the drive and steering wheel 27 through flexible link 30. A link 30 is a multimember body that is flexible and accommodates the ups and downs of the driveway 12 with respect to the guide beam 29. One end of the link 30 connects to the housing 28 through a ball joint to allow more flexibility.

Motion Control System Comprising:

A handheld control pad is communicates with a power control module means of metallic wires and or by radio signals. The operator can control the motors at will by manipulating the handheld controller. A programmable computer that operates the system using pre-programmed commands that is packaged along with the said control module is capable of operating snow removing system 11 as a robot. The preprogrammed computer is input all the pertinent details such as the profile of the driveway 12.

A maneuverable video camera mounted on the said snow removing system 11 that wirelessly communicates with a computer which displays the image coming from the video camera.

A computer system such as a laptop at a remote location can communicate control module through radio signals and with or without the use of satellite system.

The programmed control module constantly measure the current drawn by all the motor and makes decisions accordingly. For instance, if the plow 14 starts pushing too much snow then it could stall and the system cannot proceed further. In such an even the current drawn by the slider motor increases and the controller senses the high current and retracts the complete system so that the amount of snow that is being pushed by the plow 14 is reduced. After retracting the slider motor is powered again. If the current drawn is still higher than the preset limits the whole system is retracted. The process is continued until the system can function normally again. All the corrective action is memorized by the system and the system learns the prevailing conditions and acts accordingly.

Solvent Dispersing System Comprising:

A pump and reservoir assembly located along the said slider support beam 18 that delivers solvent solution to melt snow through one or more nozzles pointed deliver the solvent at desired locations. The solvent makes it easier for the plow 14 to move the snow across the driveway 12.

A Satellite Guiding System Comprising:

Two or more signal transmitters/receiver modules located away from the snow removing system 11 and one or more signal transmitter/receiver module located on the snow removal system that communicate with each other and send signals to the programmable computer can identify the location of the entire system and control the movement of the entire snow removal system by appropriately operating the motors in the system.

A Theft Deterrent System Comprising:

A transmitter located hidden in the operating vicinity of the snow removing system 11 that sends a signal in a specific frequency while a receiver in the control module unit permits the system to operate only if it receives the system specific signal from the said transmitter. Operating the system in a different environment without the proper signal is not possible. This deters potential thieves to walk away with a system that is operating without being watched.

A loud audio alarm system is activated if the system is dismantled or disconnected without following protocol that includes password protection.

A Satellite Tracking System Comprising:

A signal transmitter hidden in the snow removing system 11 that sends specific signals to a satellite system.

An external agency can track the signals from the transmitter that can locate the stolen system.

A Power Source System Comprising:

A power distribution center located inside the housing 28 receives electric power from a source and distributes the power to the motors according to the instructions from the control module.

The power source in one or more of the following; electric power from household power outlet, a generator attached to the housing 28 is operated by an internal combustion engine also attached to the housing, a lead acid battery, a generator, a charging system and an internal combustion engine combination to provide sustained power. This makes the system useable in an environmentally friendly manner and also permits the use of the machine is areas where electric power from grid is not available.

The invention claimed is:

1. A snow removing system for removing snow from a surface area comprising:
   a guiding system comprising a guiding track fixed to said surface area defining at least one boundary of a snow removal area;
   a snow throwing system moveably located on said guiding system with at least one motor driven wheel riding on said track;
   a snow collecting system that removes snow from said surface area towards said snow throwing system comprising at least one plow movable along a plow track with one end connected to said throwing system, said at least one plow is attached to a motor driven wheel that engages said plow track;
   wherein said snow throwing system comprises a motor driven impeller housed in a casing to throw said snow delivered by said collecting system through a chute;
   a motion control system that controls the operation of said snow removing system including said snow collecting and throwing systems.

2. The snow removing system of claim 1 wherein said guiding track comprises a prismatic track.

3. The snow removing system of claim 1 wherein said plow track comprises a prismatic track.

4. The snow removing system of claim 1 wherein said motion Control system comprises an electric controller for regulating the movement of both collecting and throwing systems.

* * * * *